(12) United States Patent
Krogh et al.

(10) Patent No.: US 8,366,360 B2
(45) Date of Patent: Feb. 5, 2013

(54) TIP END BRACKET

(75) Inventors: Mikkel Verner Krogh, Brande (DK); Jonas Madsen, Tjæreborg (DK)

(73) Assignee: Siemens Aktiengesellschaft, München (DE)

( * ) Notice: Subject to any disclaimer, the term of this patent is extended or adjusted under 35 U.S.C. 154(b) by 152 days.

(21) Appl. No.: 12/989,666

(22) PCT Filed: Oct. 31, 2008

(86) PCT No.: PCT/EP2008/064774
§ 371 (c)(1),
(2), (4) Date: Oct. 26, 2010

(87) PCT Pub. No.: WO2009/141018
PCT Pub. Date: Nov. 26, 2009

(65) Prior Publication Data
US 2011/0031292 A1    Feb. 10, 2011

Related U.S. Application Data

(60) Provisional application No. 61/055,643, filed on May 23, 2008.

(51) Int. Cl.
*B60P 3/40* (2006.01)
(52) U.S. Cl. .......................................................... 410/44
(58) Field of Classification Search ................. 410/44, 410/49, 155
See application file for complete search history.

(56) References Cited

U.S. PATENT DOCUMENTS

| | | | | |
|---|---|---|---|---|
| 2,725,241 A * | 11/1955 | Leonard, Jr. | ................. | 410/44 |
| 2,851,235 A * | 9/1958 | Henig | ................. | 410/44 |
| 3,071,269 A * | 1/1963 | Moulds, Jr. | ................. | 414/608 |
| 3,120,939 A * | 2/1964 | Himmelberger et al. | ....... | 410/44 |
| 3,262,664 A * | 7/1966 | Paraskewik | ................. | 410/49 |
| 3,658,011 A * | 4/1972 | West et al. | ................. | 410/45 |
| 4,290,570 A * | 9/1981 | Smolik et al. | ................. | 244/173.3 |
| 4,308,800 A * | 1/1982 | Mohacsi et al. | ................. | 105/159 |
| 5,044,846 A * | 9/1991 | Richardson | ................. | 410/47 |
| 6,231,284 B1 * | 5/2001 | Kordel | ................. | 410/49 |
| H0002061 H * | 4/2003 | Tunnell | ................. | 410/47 |
| 7,303,365 B2 * | 12/2007 | Wobben | ................. | 410/45 |
| 7,581,934 B2 * | 9/2009 | Wobben | ................. | 416/244 R |
| 7,591,621 B1 * | 9/2009 | Landrum et al. | ................. | 410/45 |
| 7,670,090 B1 * | 3/2010 | Landrum et al. | ................. | 410/44 |
| 7,744,318 B2 * | 6/2010 | Wobben | ................. | 410/45 |
| 7,967,536 B2 * | 6/2011 | Broderick et al. | ................. | 410/45 |
| 8,056,203 B2 * | 11/2011 | Madsen | ................. | 29/407.09 |
| 8,096,739 B1 * | 1/2012 | Landrum et al. | ................. | 410/45 |
| 8,142,120 B2 * | 3/2012 | Landrum et al. | ................. | 410/44 |
| 8,177,462 B2 * | 5/2012 | Riddell | ................. | 410/44 |
| 8,192,117 B1 * | 6/2012 | Landrum et al. | ................. | 410/45 |
| 2005/0002749 A1 | 1/2005 | Andersen | | |
| 2005/0063795 A1 * | 3/2005 | Jagos et al. | ................. | 410/49 |
| 2007/0036627 A1 * | 2/2007 | Wright et al. | ................. | 410/49 |

(Continued)

FOREIGN PATENT DOCUMENTS

| | | |
|---|---|---|
| CN | 101012021 A | 8/2007 |
| DE | 10211357 A1 | 9/2002 |

(Continued)

*Primary Examiner* — H Gutman

(57) ABSTRACT

A mounting bracket device and method for mounting a blade of a wind turbine to a transportation device are disclosed. The mounting bracket device includes a clamping device for holding the blade, an adjustment system, and a connecting system adapted for being removably connected to the transportation device. The connecting system removably connects the clamping device and the adjustment system to the transportation device. The adjustment system is adapted to align the clamping device with respect to the transportation device around the first rotary axis and around a second rotary axis.

13 Claims, 12 Drawing Sheets

U.S. PATENT DOCUMENTS

2007/0177954 A1* 8/2007 Kootstra et al. .................. 410/44
2011/0185571 A1* 8/2011 Maj et al. ........................ 29/889

FOREIGN PATENT DOCUMENTS

| | | |
|---|---|---|
| EP | 1849719 A1 | 10/2007 |
| JP | 60101803 A | 6/1985 |
| JP | 6114778 A | 4/1994 |
| JP | 3042740 U | 10/1997 |
| JP | 2000072082 A | 3/2000 |
| JP | 2005524562 A | 8/2005 |
| JP | 3134654 U | 8/2007 |
| WO | WO 03/057528 A1 | 7/2003 |
| WO | WO 2005005286 A1 | 1/2005 |
| WO | WO 2007113352 A1 | 10/2007 |

* cited by examiner

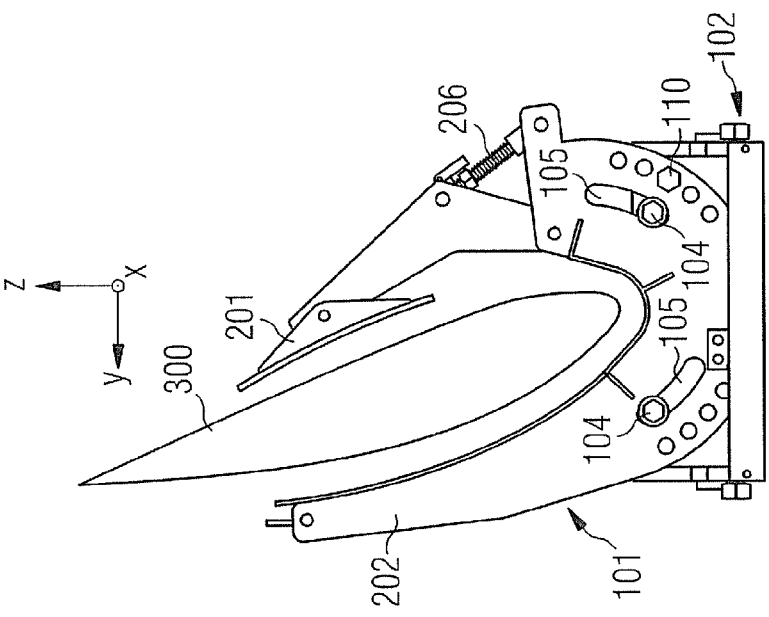
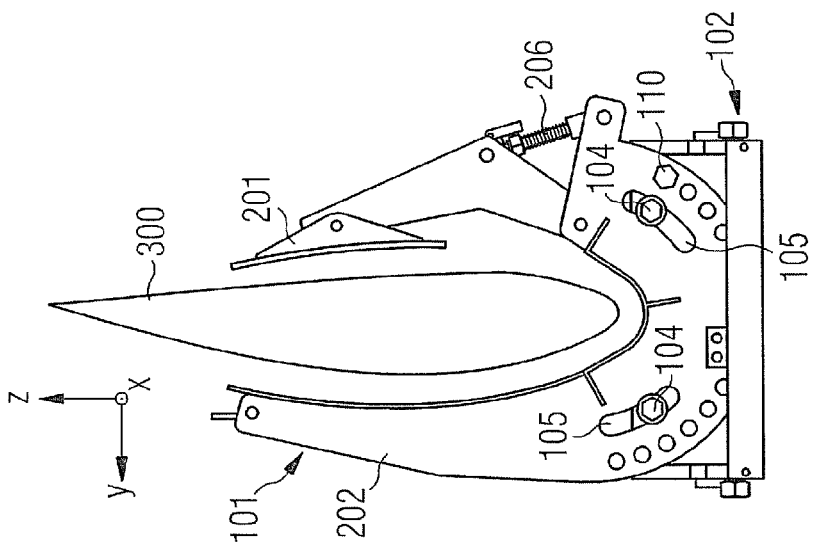
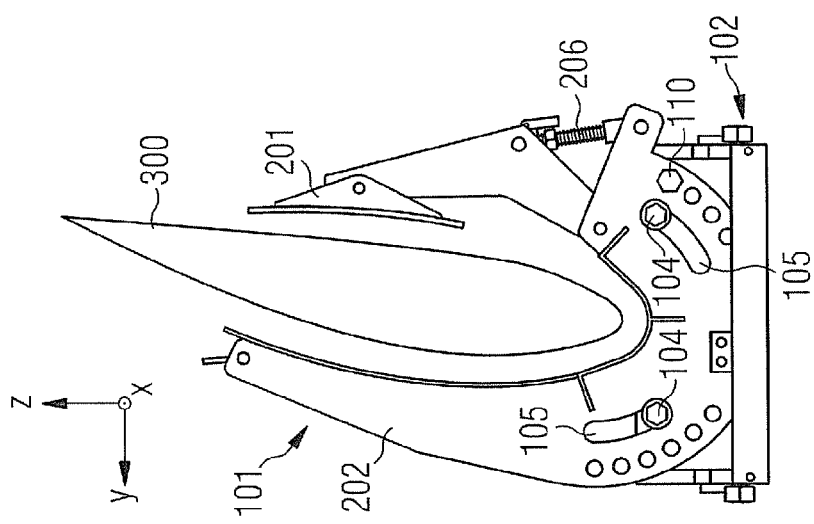

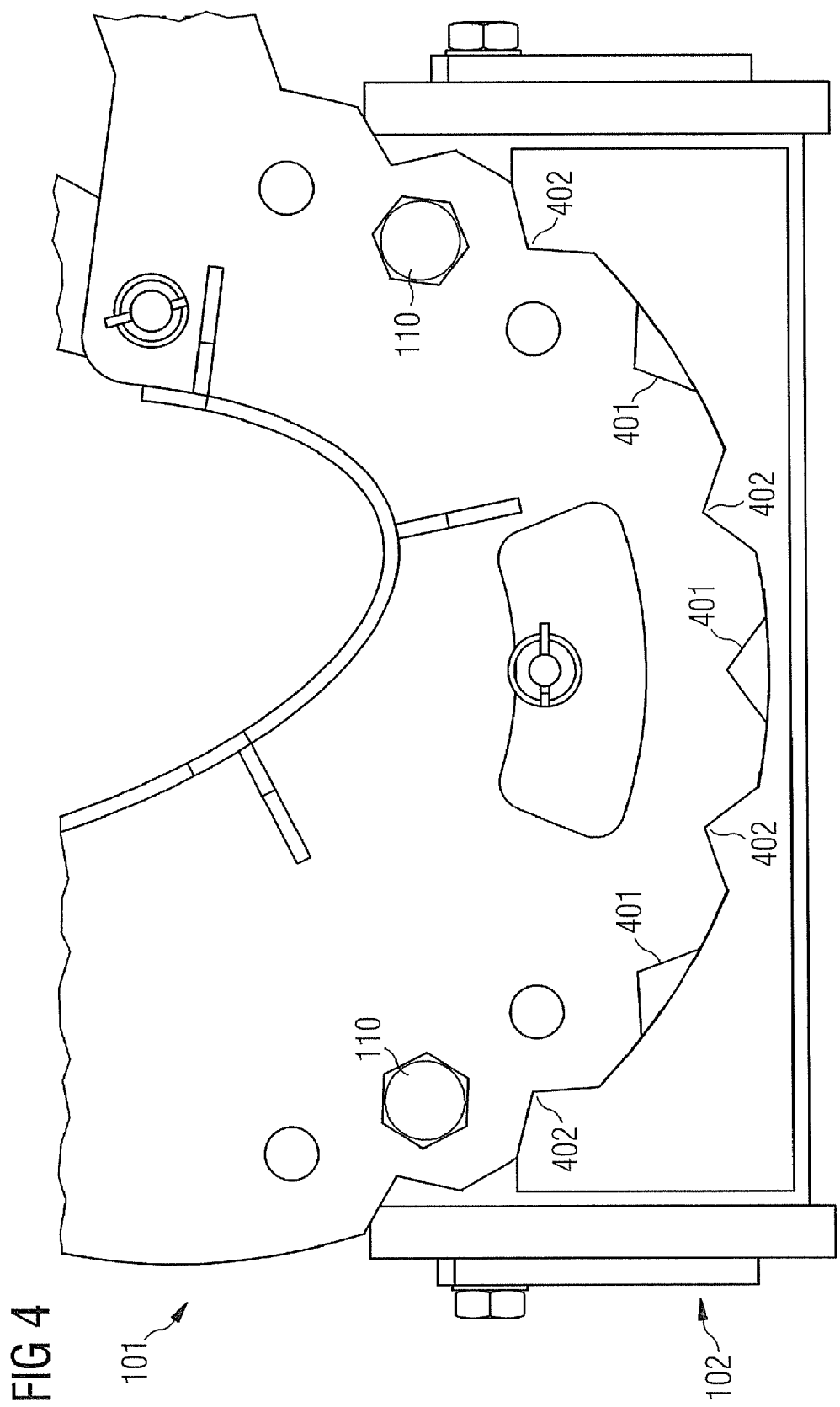

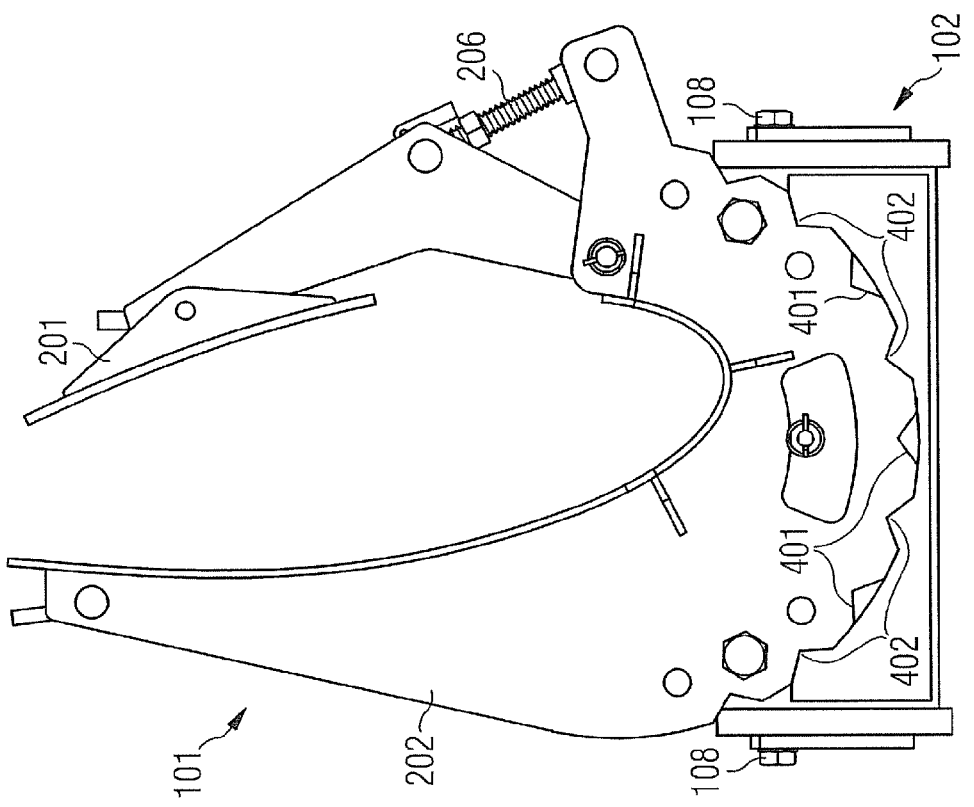
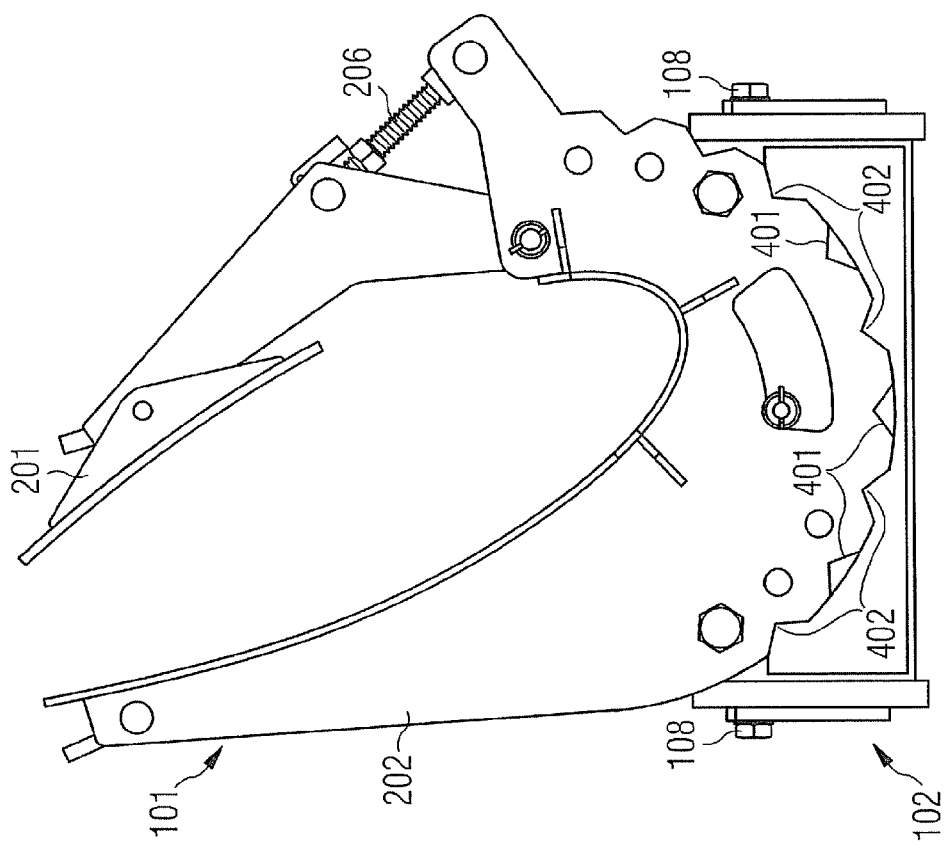

TIP END BRACKET

CROSS REFERENCE TO RELATED APPLICATIONS

This application is the US National Stage of International Application No. PCT/EP2008/06774, filed Oct. 31, 2008 and claims the benefit thereof. The International Application claims the benefits of U.S. provisional application No. 61/055,643 filed May 23, 2008. All of the applications are incorporated by reference herein in their entirety.

FIELD OF INVENTION

The present invention relates to a mounting bracket device for mounting a blade of a wind turbine to a transportation device. Moreover, the present invention relates to a method of mounting a blade of a wind turbine to a transportation device.

ART BACKGROUND

In modern times, energy is produced more and more by regenerative energy sources, such as wind turbines. In order to increase the efficiency of wind turbines, blades of the wind turbines are getting larger and larger. When increasing the size of the blades of the wind turbines, the transportation of the blades from the fabrication location to the location of operation is getting more and more complex.

Transportation of a wind turbine blade is done by trucks, trains or ships. Thus, by transporting the blades by these conventional transportation means, the available space for transportation is restricted by the environment, i.e. when transporting a blade by train or by truck the blades have to be fit to conventional tunnels or allowable heights in order to fit under it, for example. When transporting the blades by ship, the blades have to be stored in such a way, that the storage space is small, for example. Moreover the wind shadow area of the wind should be reduced in order to prevent tilting of the blades during transportation.

Hence, the environment conditions, such as diameters of tunnels or street sizes, may be a factor that restricts the size of wind turbine blades.

WO 03/057528 A1 describes a transport vehicle for a rotor blade of a wind energy turbine. The transport vehicle comprises a tractive engine and a trailer, which are interconnected by the cargo itself during the transport of the latter. A fixing device is configured in such a way, that it permits a rotation of the rotor blade about its longitudinal axis and a drive for rotating the rotor blade that is provided on the tractive engine and/or the trailer.

EP 1 849 719 A1 describes a transportation unit for a wind turbine rotor blade. The transportation system for a wind turbine rotor blade may include a root fixture adapted for receiving the root end of the wind turbine rotor blade and a tip end fixture adapted to receive the tip end of the wind turbine rotor blade. The root fixture and the tip end fixtures are provided as separate transportable units.

SUMMARY OF THE INVENTION

It is an object of the invention to provide a flexible blade transportation that is adjustable for a variety of different ways of transportation.

This object may be solved by a mounting bracket device for mounting a blade of a wind turbine and by a method of mounting a blade of a wind turbine to a transportation device according to the independent claims.

According to a first exemplary embodiment of the present invention, a mounting bracket device for mounting a blade of a wind turbine to a transportation device is provided. The mounting bracket device comprises a clamping device for holding the blade (rigidly), an adjustment system and a connecting system adapted for being removably fixed to the transportation device. The connecting system connects the clamping device and the adjustment system to the transportation device. The adjustment system is adapted to align the clamping device with respect to the transportation device around a first rotary axis and around a second rotary axis.

According to a further exemplary embodiment, a method of mounting a blade of a wind turbine to a transportation device is described. A clamping device and an adjustment system are fixed to the transportation device by a connecting system, wherein the clamping device is adapted to hold the blade. The clamping device is aligned with respect to the transportation device around a first rotary axis and around a second rotary axis by the adjustment system.

The term "clamping device" may denote a device that fixes or holds the blade rigidly. The clamping device may be for example adapted to clamp the blade rigidly or may be adapted to fix the blades rigidly by connecting elements, such as screw elements or magnetic devices, for example.

The term "adjustment system" may denote a flexible system that may move and align the clamping device with respect to the connecting system and/or the transportation device. The adjustment system may provide a desired flexible alignment of the clamping device, so that the clamping device may be aligned until a desired position is achieved. Further, the adjustment system may fix the clamping device in this desired position.

The term "connecting system" may denote an adapter device that fixes the clamping device and the adjustment system to the transportation unit. Furthermore, the connecting system provides means for flexibly fixing the connecting system to the transportation unit. I.e., the connecting system may be adapted for providing adaptable fixation means for connecting the connecting system to a variety of different transportation devices. I.e., the connecting system may be adapted to be fixed to a ship and to a truck without any amendments in the design of the connecting system, so that one embodiment of the connecting system may be connected to the ship and the truck as well.

By using the mounting bracket device, an adjustable and flexible transportation device for a blade of a wind turbine may be provided, so that the mounting bracket device is adjustable and flexible to different ways of transportation Thus, the blade may be transported in a safer way, so that damages of the blade during the transportation may be avoided. The connecting system of the mounting bracket device provides a connection for truck, rail and sea transport devices without any changes in the design of the mounting bracket device itself. Furthermore, the adjustment system of the mounting bracket device provides a way of adjusting the blade in different angle positions around at least two rotary axes, so that, depending on the way of the transportation, desired angle positions may be adjusted. Thus, a flexible adjustment around two rotary axes may be provided, so that an improved alignment to a variety of different restrictions of different transportation devices may be provided. Furthermore, by using the connecting systems adapted for being removably fixed to the transportation device, it is possible to clamp the blade with the clamping device at the location of fabrication and the mounting bracket device is fixable to different types of transportation devices without the need of taking the blade out of the clamping device.

The term "first rotary axis" may denote for example the longitudinal axis or the horizontal axis of a blade, e.g. the x-axis. The term "second rotary axis" may denote an orthogonal axis with respect to the first rotary axis, such as a y-axis or a z-axis of a Cartesian coordinate system. The term "third rotary axis" may denote an orthogonal axis with respect to the first rotary axis and the second rotary axis, such as a vertical axis or a horizontal axis perpendicular to the first rotary axis (x-axis). In generally, all three rotary axes (first rotary axis, second rotary axis, third rotary axis) provide different axial directions with respect to each other.

According to a further exemplary embodiment, the adjustment system comprises an engaging element extending along the first rotary axis. The clamping device comprises a long hole, wherein the engaging element is engaged by the long hole. The long hole comprises a curved shape that defines a curved moving path of the clamping device, so that the clamping device follows the moving path defined by the curved shape of the long hole when the clamping device is rotated around the first rotary axis. The curvature of the long hole may be aligned for instance to a movement of the engagement element during a rotation of the clamping device around the first rotary axis. I.e., the engagement elements may be located at a defined radius at the clamping device wherein the radius defines a certain distance between the centre of rotation (first rotary axis) and the point of location of the engagement element at the clamping device. The curvature of the long hole may comply with a rotary movement of the clamping device, so that when the clamping device rotates around the first rotary axis, the engagement element follows the moving path along the long hole. With other words, the engagement element provides a guiding function for the long hole and thus a supporting function for the clamping device. By the present exemplary embodiment, the long hole and the engagement element may transmit a weight force of the blade from the clamping device to the adjustment system also during the movement of the clamping device. Furthermore, because a force may be transmitted throughout the complete alignment procedure between the clamping device and the alignment system, the risk of unintentional motion of the clamping element or the risk losing of the blade may be reduced.

According to a further exemplary embodiment, the adjustment system comprises a threaded rod. The clamping device comprises a guiding element. The guiding element is connected to the threaded rod, so that the guiding element is movable along the threaded rod due to a rotation of the threaded rod. The guiding element is fixed to the clamping device in such a way that a movement of the guiding element along the threaded rod causes a rotation of the clamping device around the first rotary axis. A threaded rod, such as a spindle, may provide an external thread and the guiding element may comprise a respective internal screw thread, so that when rotating the threaded rod, the guiding element moves along the threaded rod dependent on the rotation direction of the threaded rod.

During movement of the guiding element along the threaded rod, the clamping device may rotate around the first rotary axis, so that an adjustment may be provided when rotating the threaded rod. Thus, by the described mechanism, during the complete adjusting process, the guiding element and the threaded rod are connected, so that during adjusting the clamping device a risk of a free movement and the risk of releasing the clamping device unintentionally may be provided. The guiding element may be fixed to the clamping device, so that the guiding element is fixed in a extending direction of the threaded rod, wherein the guiding element may be adjusted in an orthogonal direction to the threaded rod with respect to the clamping device, so that an adjustment of the guiding element due to the rotation of the clamping device may be provided.

According to a further exemplary embodiment, the clamping device comprises an engaging profile. The adjustment system comprises a protruding element. The protruding element is adapted for engaging into the engaging profile, so that depending on an engagement position of the protruding element into the engaging profile an alignment of the clamping device with respect to the transportation device around the first rotary axis is adjusted. The engaging profile may comprise for instance grooves that are located around a contact surface of the clamping device. When the clamping device is rotated around the first rotary axis, the engaging profile rotates around the first rotary axis as well and thus a relative position between the engaging profile and the protruding element is changed. In the position where the protruding element engages the engaging profile a further rotation around the x-axis may be prevented. Thus, a rigid connection between the adjustment system and the protruding element may be provided without any complex mechanism.

According to a further exemplary embodiment, the clamping device comprises a bearing pin extending along the second rotary axis. The adjustment system comprises a receiving groove. In a further exemplary embodiment, the bearing pin may also be assigned to the adjustment system and the receiving groove may be assigned to the clamping device. The bearing pin is adapted for being engaged into the receiving groove pivotable, so that the clamping device is pivotable around the second axis. Thus, an incomplex pivot mechanism for the adjustment system may be provided by simply fixing bearing pins to the clamping device. When pivoting the clamping device around the second rotary axis, first of all e.g. fixing screws may be released and the clamping device may be aligned to a desired position around the secondary rotary axis. Finally the fixing screws may be fixed again in order to fix the clamping device in the desired position. Rotations about the second rotary axis and/or the third rotary axis may thus be free to avoid coercion in the adjustments system due to a flexible movement of the blade or the transportation device.

According to a further exemplary embodiment, the adjustment system comprises a shaft element. The shaft element is adapted to connect the mounting bracket device with the transporting device in a pivotable manner around a third rotary axis. The shaft may be rotatably supported around the third rotary axis in a receiving groove of the connecting system or the transportation device. The shaft may also be formed as a corner casting and may be a receptacle for a twist lock.

According to a further exemplary embodiment of the present invention, the connecting system comprises an adapter element. The adapter element is adapted for fixing the mounting bracket device to different transportation devices. The adapter element may comprise specified connecting elements for ships, trucks or rail vehicles, so that one and the same connecting system may be connected to all different transportation devices without any mechanical or physical adjustments of the connecting systems. The adapter element may comprise as well an element, such as a corner casting for providing a twist-lock fitting or a belt connection. A twist lock allows some rotation about all three axes and thus preventing unwanted coercion while fixing the clamping device in all three directions. A twist-lock connection may be fixed to a standardized corner casting of the connecting system and/or the adjustment system. When a desired position around the first, second and/or third rotary axis is provided, the twist-lock may be rotated around e.g. 90° and thus generates a form fit connection with the corner casting (shaft). Thus, standardized receiving elements (twist-lock elements) for a variety of transportation units may be used for fixing the mounting bracket device in a desired position.

According to a further exemplary embodiment, the clamping device comprises a movable jaw and a clamping jaw. The movable jaw is movable towards the clamping jaw for clamping the blade between the movable jaw and the clamping jaw. By providing the clamping device with a movable jaw and a clamping jaw a clamping force may be individually adapted, for instance due to a different width of several blade elements. Thus, the movable jaw may press the blade to the clamping jaw in a defined clamping pressure, so that no damages at the blade occur.

According to a further exemplary embodiment, the clamping device comprises a rigging screw for driving the movable jaw. The rigging screw may for instance consist of a threaded rod with an external thread, wherein the movable jaw comprises an internal screw thread. When rotating the rigging screw, the movable jaw moves along the rigging screw. Thus, the clamping force of the movable jaw may be adjusted. The rigging screw may be driven by hydraulic or pneumatic mechanisms, so that also an automatic adjustment and movement of the movable jaw may be provided. The fixation of the movable jaw along the rigging screw may be provided by a counternut for instance.

According to a further exemplary embodiment, at least one of the movable jaw and the clamping jaw is adjustable to a size of the blade. I.e., the contact surface between the movable jaw and/or the clamping jaw to the blade may be adjusted, so that a variety of different sized blades may be clamped without damaging the blade by clamping. The jaws may be adjusted to a curvature of the blade. Moreover, the jaws may be adjusted in its heights, so that the locations where the jaws contact the blade are adjustable. Thus, the mounting bracket device may be applied for a variety of different sized blades.

According to a further exemplary embodiment, at least one of the movable jaw and the clamping jaw comprises a cushioning element. The cushioning element is adapted for cushioning the blade. I.e., the cushioning element may prevent a damage of the blade due to transmitting the clamping force from one of the jaws to the blade. The cushioning element may comprise a polyurethane material for providing a soft contact of the jaws with the blade.

According to a further exemplary embodiment, the clamping device comprises a transport opening. The transport opening is adapted for receiving a strap lashing for fixing the blade. Thus, the blade may be wrapped by the strap lashing or a belt in order to provide a further fixation means of the blade to the mounting bracket device. By providing a transport opening at the clamping device, the strap lashing may be fixed to the mounting bracket device, so that no further connections at the transportation device are necessary. Thus, a change of the transportation device is eased.

With the present invention a mounting bracket device for mounting a blade of a wind turbine to a transportation device is provided, in particular a mounting bracket device for mounting a tip end of the blade to the transportation device. The mounting bracket device may comprise connections for truck, rail and sea transportation devices and may provide an adjustment system for adjusting the blade to different transport devices. The mounting bracket device comprises a clamping device for holding the blade in a desired position. In order to hold the blade firmly, the clamping device may clamps the blade between jaws, for instance by tightening the rigging screw. Furthermore, the clamping device provides cushioning elements between the contact surfaces of the jaws and the blade in order to prevent a damage of the blade during transportation. The mounting bracket device may be attached to the blade already at the factory and may remain attached during the entire transportation until arrival on the operation location. The connecting system may enable to hold the mounting bracket to a variety of given transportation devices by especially adapted connecting elements.

It has to be pointed out that of course any combination of features relating to different subject matters is also possible.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The invention will be described in more detail hereinafter with reference to examples of embodiment but to which the invention is not limited.

FIG. 3A to FIG. 3C show a sequence of rotating the blade counterclockwise according to an exemplary embodiment;

FIG. 4 shows a front view of a mounting bracket device with an engaging profile according to an exemplary embodiment of the present invention;

FIG. 5A and FIG. 5B show an exemplary sequence of adjusting a blade counterclockwise according to the exemplary embodiment of FIG. 4;

DETAILED DESCRIPTION

Figure 1:
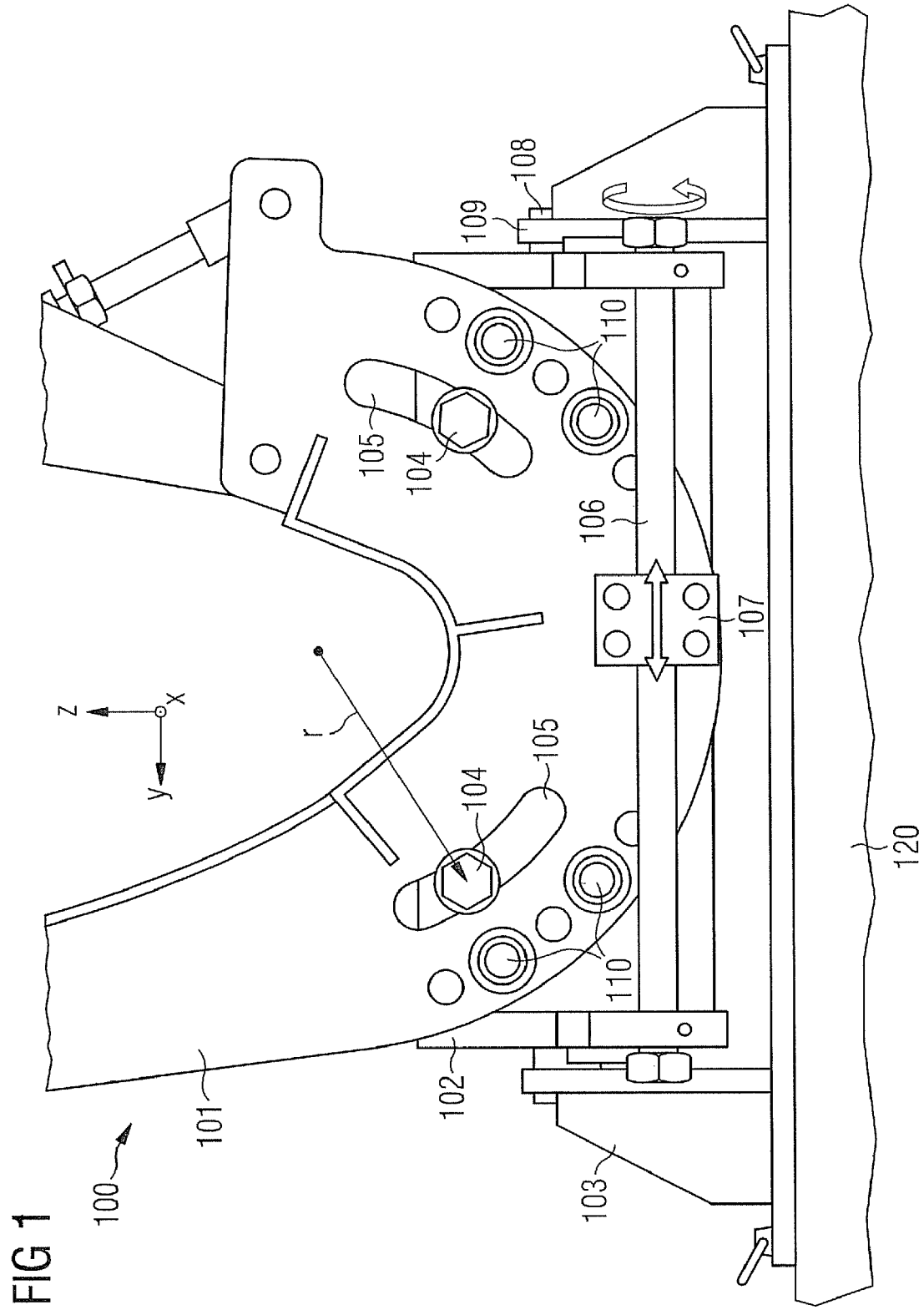
FIG. 1 shows a front view of a mounting bracket device according to an embodiment of the present invention.

The illustration in the drawing is schematically. It is noted that in different figures, similar or identical elements are provided with the same reference signs or with reference signs, which are different from the corresponding reference signs only within the first digit. The view in the figures is schematic and not fully scaled.

FIG. 1 illustrates a schematic view of one exemplary embodiment of the present invention. A mounting bracket device 100 for mounting a blade 300 of a wind turbine to a transportation device 120 is shown. The mounting bracket device 100 comprises a clamping device 101 for holding the blade 300 rigidly, an adjustment system 102 and a connecting system 103 adapted for being removably fixed to the transportation device 120. The connecting system 103 connects the clamping device 101 and the adjustment system 102 to the transportation 120. The adjustment system 102 is adapted to align the clamping device 101 with respect to the transportation device 120 around a first rotary axis x and around a second rotary axis y.

FIG. 1 furthermore illustrates a Cartesian coordinate system for a better orientation, wherein the x-axis may illustrate the first rotary axis along a longitudinal direction of a blade and wherein the second rotary axis may illustrate the y-axis. It should be noted that in another embodiment the second rotary axis y may also comprise the z-axis of the Cartesian coordinate system.

Furthermore, FIG. 1 illustrates an adjustment system 102 according to an embodiment of the present invention. For adjusting the clamping device 101 the adjustment system may comprise an engagement element 104 that is adapted for being engaged by a long hole 105 of the clamping device 101. The engagement element 104 is spaced from the first rotary axis x with a defined radius r, wherein when pivoting the clamping device 101 with respect to the adjustment system 102, the long hole 105 curvature is aligned to a moving path of the clamping device 101 defined by the radius r. I.e., the long hole 105 of the clamping device 101 provides a curved shape, wherein this curved shape is aligned to the movement path of the engagement element 104 during rotation of the clamping device 101 around the first rotary axis x.

FIG. 1 illustrates furthermore a drive mechanism for rotating the clamping device 101 around the first rotary axis x. Therefore, the clamping device 101 may comprise a guiding element 107 with an internal screw thread that is mounted to a threaded rod 106 of the adjustment system 102. As illustrated in FIG. 1, when rotating the threaded rod 106, the guiding element 107 moves laterally in a direction of the threaded rod 106. Thus, when moving the guiding element 107 laterally, the clamping device 101 is pivoted around the first rotary axis x. If a desired position of the clamping device 101 is reached, the clamping device 101 may be fixed to the adjustment system 102 by fixing screws 110.

With the pivoting mechanism illustrated in FIG. 1, the clamping device 101 is guided during the entire aligning sequence, i.e. the weight force of the blade is always transmitted from the clamping device 101 via the engagement element 104 to the mounting bracket device 100, so that no uncontrolled rotation or movement of the clamping device 101 during the adjustment sequence occurs.

Furthermore, FIG. 1 illustrates a bearing pin 108 that may be attached into a receiving groove 109 in order to provide a rotation for instance around the second rotary axis y.

Figure 2:
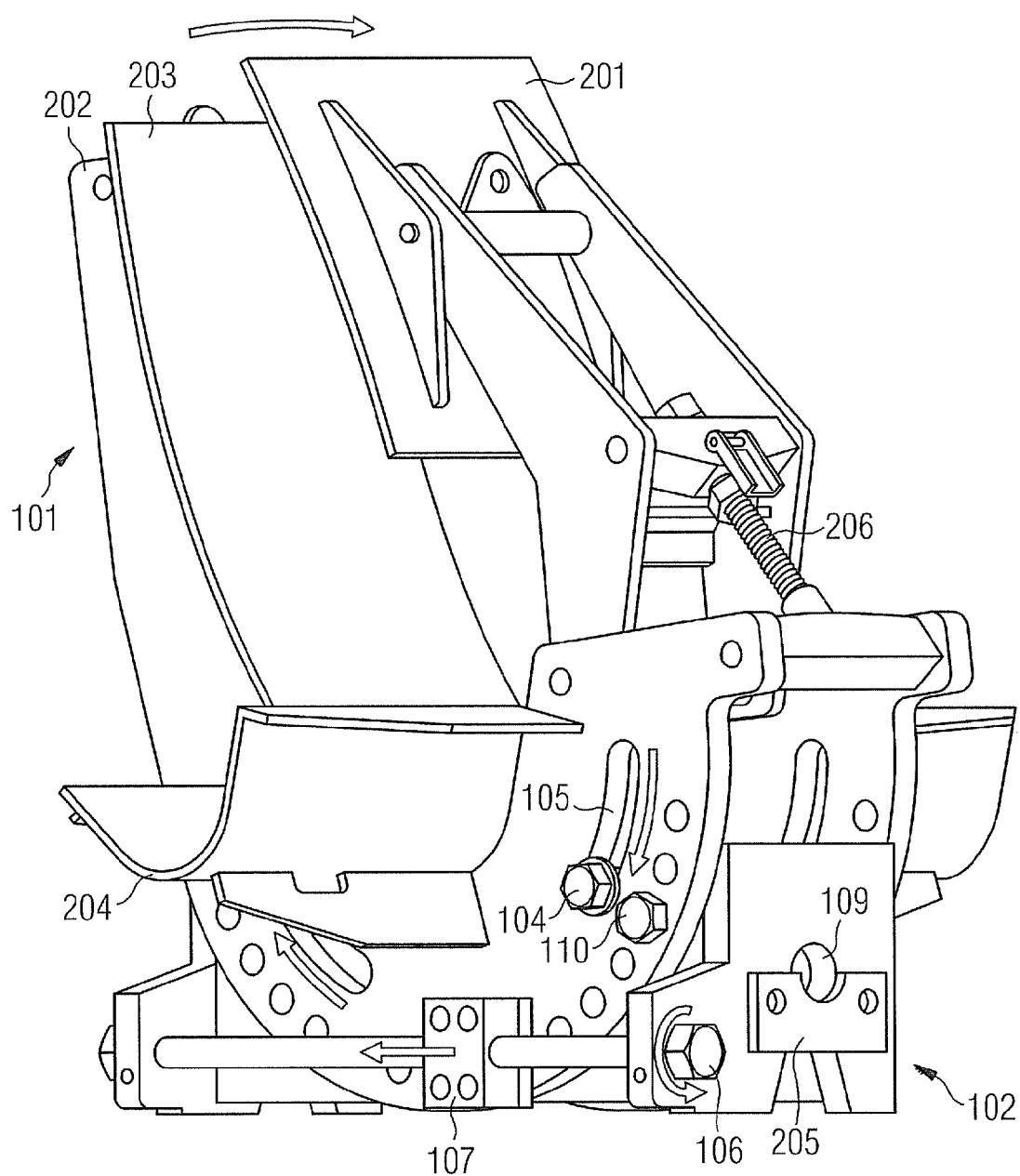
FIG. 2 shows a perspective view of the exemplary embodiment shown in FIG. 1.

FIG. 2 illustrates a perspective view of the exemplary embodiment shown in FIG. 1. In particular, the receiving groove 109 is shown to which the bearing pin 108 may be inserted. In the receiving groove 109 the bearing pin 108 may be pivotable supported around the second rotary axis y. In order to prevent an upward movement of the clamping device 101, a securing element 205 may be fixed to the adjustment system 102.

FIG. 2 furthermore illustrates the clamping device 101 comprising a movable jaw 201 and a clamping jaw 202. The movable jaw 201 is movably supported by a rigging screw 206, so that the movable jaw 201 is movable towards the clamping jaw 202, e.g. in a horizontal direction. Inside of the movable jaw 201 and the clamping jaw 202 a cushioning element 203 may be attached to, in order to damp and cushion the clamped blade 200 for providing damages. The movable jaw 201 may be connected to the clamping device 101 by an adjusting mechanism (seizing foot mechanism), so that the height of the movable jaw 201 with respect to the blade 300 may be adjusted. When the movable jaw 201 and the clamping jaw 202 engages the blade 300 above the widest point of the cross-section of the blade 300, the clamping device 101 clamps the blade 300 in a self locking manner.

Furthermore, FIG. 2 illustrates a possible moving direction of the guiding element 107 along the threaded rod 106 for rotating the clamping device 101 clockwise. Furthermore, FIG. 2 illustrates an aligning shell 204 that may comprise a similar shape as a curvature of the blade 300, so that the blade 300 may be self-aligned with respect to the clamping device 101.

FIG. 3A to FIG. 3C show a rotation sequence of the clamping device 101 counterclockwise. The blade 300 is clamped in the clamping device 101 by the movable jaw 201 and the clamping jaw 202. The blade 300 is held by the clamping device 101, so that e.g. an upward movement of the blade 300 out of the clamping device 101 may be prevented.

FIG. 3A illustrates a position of the clamping device 101 with respect to the alignment system 102. First of all the fixing screw 110 may be released. Then, the clamping device 101 is pivotable around the first rotary axis x.

FIG. 3B illustrates a movement of the clamping device 101 along the curved moving path of the long hole 105 and a rotation around the first rotary axis x occurs. In FIG. 3B the blade element is nearly in an upright vertical position.

FIG. 3C illustrates a pivoted location of the clamping device 101 with respect to the alignment system 102. The engagement element 104 is located in a left position in the long hole 105. The long hole may be provided longer, so that a further rotation around the rotary axis x may be provided. In this position, the fixing screw 10 may be fixed, so that the desired position of the clamping device 101 with respect to the alignment system 102 may be fixed.

FIG. 4 illustrates a further exemplary embodiment of the adjustment system 102 and the clamping device 101. The clamping device 101 is fixed in a desired position by the fixing screw 110. Furthermore, in a region where the clamping device 101 is in contact with the adjustment system 102, the surface of the clamping device 101 provides an engaging profile 401. On the other side, the contact surface of the adjustment system 102 provides protruding elements 402 that are formed to engage into the engaging profile 401 of the clamping device 101. When the clamping device 101, in particular engaging profile 401, is in contact with the protruding element 402, a further rotation of the clamping device 101 around the first rotary axis x is prevented.

FIG. 5A and FIG. 5B illustrates a rotating sequence of the clamping device 101 with respect to the adjustment system 102 illustrated in FIG. 4. The engaging profile 401 is engaged with the protruding elements 402. In order to pivot the clamping device 101 with respect to the adjustment system 102, the clamping device 101 is moved upwards, so that an engagement of the engaging profile 401 with the protruding element 402 is decoupled. The clamping device 101 may then be rotated around the first rotary axis x until a desired position with respect to the adjustment system 402 is aligned. Next, the clamping device 101 may be fixed to the adjustment system 102 in the desired position by engaging the protruding element 402 with the engagement profile 401 in the desired changed position. I.e., the protruding elements 402 engage in other grooves of the engaging profile 401 as in the position shown in FIG. 5A. When the protruding elements 402 and the engaging profiles 401 are designed e.g. in a triangular shape as shown in FIG. 4 to FIG. 5B, the clamping device 101 is self-aligned during the engaging process of the triangular shape protruding elements 402 into the respective engaging profile 401. The inner surfaces of each engaging profile 401 may be formed as a vee-groove with an angle of vee. The protruding elements 402 may comprise a triangular shape with a vertex in the direction to the inner surface of the engaging profile 401. The angle of vee may be chosen sufficiently large, so that the vertex of the protruding element 402 may be engaged by the engaging profile 401. Thus, the engaging profile 401 provides a sufficiently large angle of vee to prevent a jamming of the engaging profile 401 an the protruding elements 402 to release each other when lifting the clamping device 101 vertically out of its engaged position with respect to the adjustment system 102.

Figure 6:
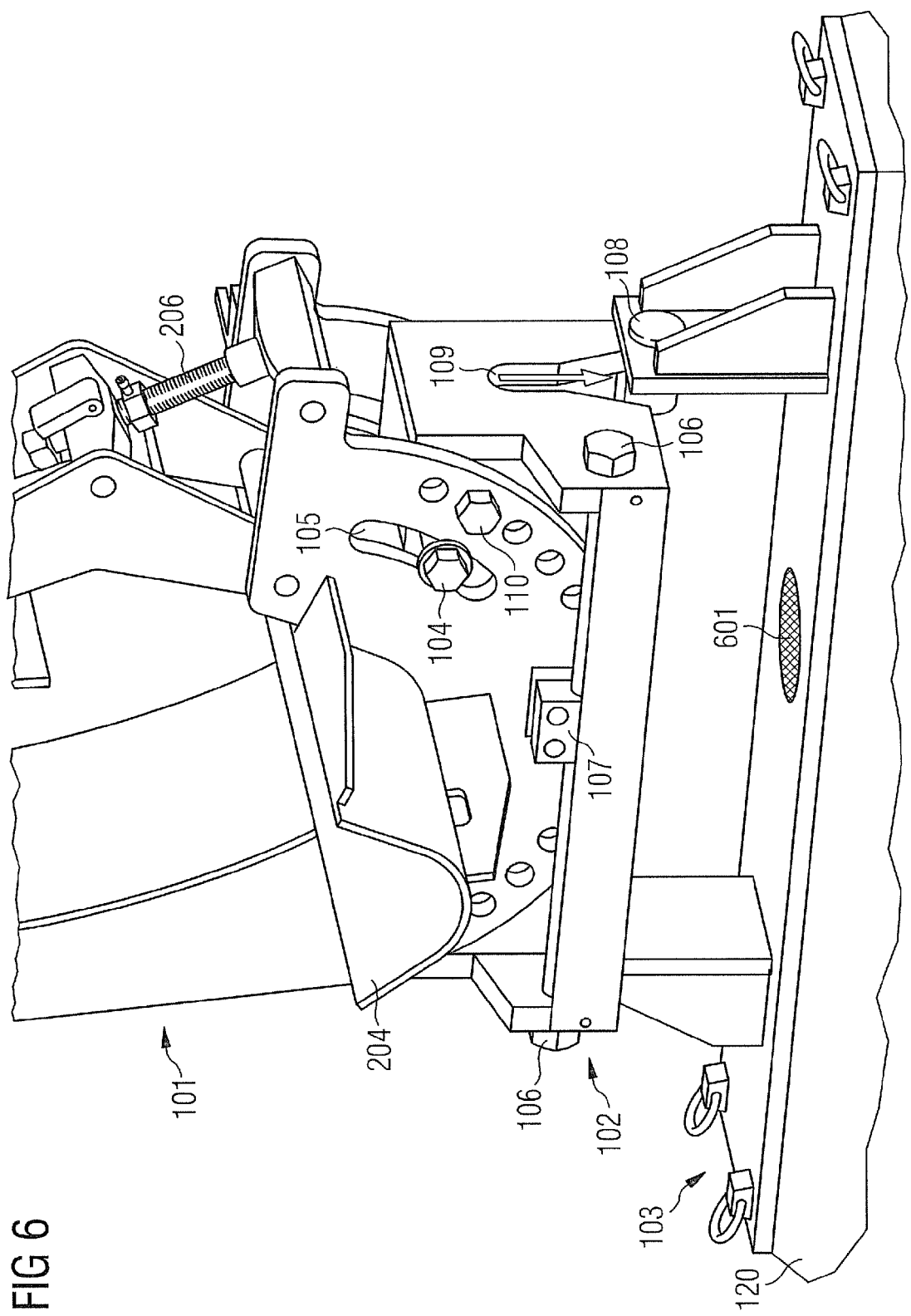
FIG. 6 illustrates a connection of the adjustment system with the connecting system according to an exemplary embodiment.

FIG. 6 illustrates a perspective view of an exemplary embodiment of the present invention. The mounting bracket device 100 comprises the guiding element 107, the threaded rod 106 and the long hole 105, to which the engagement element 104 may be engaged. Furthermore, FIG. 6 illustrates an adapter element 601 that may be flexibly mounted to a variety of different transport devices 120.

Figure 7:
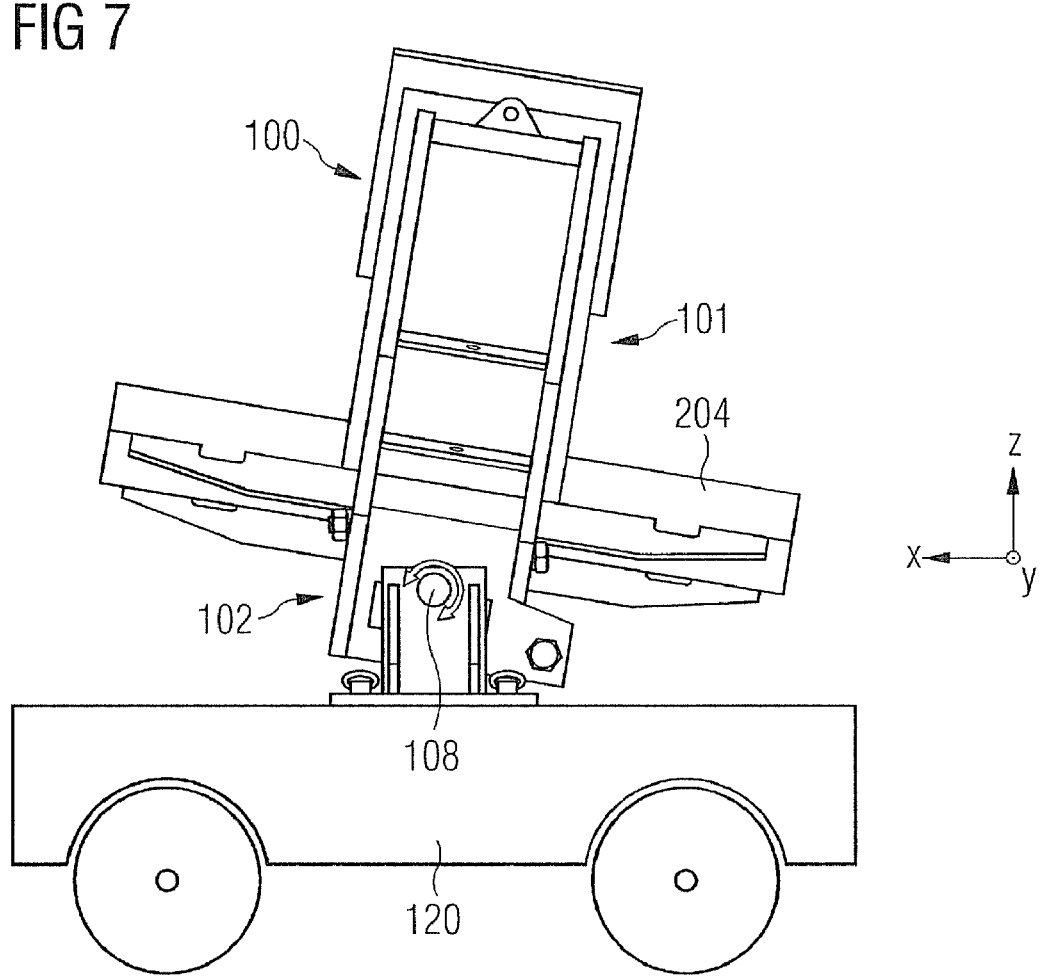
FIG. 7 illustrates a schematical view of the blade and the mounting bracket device attached to a rail vehicle according to an exemplary embodiment.

FIG. 7 illustrates an exemplary view of a blade 300 fixed by the mounting bracket device 100 to a truck 120. The mounting bracket device 100 may be in contact with a tip end of a blade 300. The mounting bracket device 100 provides a rotation of the clamping device 100 around the first rotary axis x and the second rotary axis y. It is useful to pivot the blade 300 around the first rotary axis x in order to comply with space restrictions due to a variety of different trans-port devices 120. Furthermore, as shown in FIG. 7, the surface or the contour of the blade 300 may not be parallel to the horizontal axis. I.e., the distance between the blade 300 and the transport device 120 is on the right side smaller than in the region of the tip end of the blade 300, i.e. on the left end side of the blade 300. Thus, in order to provide a proper fixation, the aligning shell 204 as well as the clamping device 101 should be aligned to the blade 300. Therefore, the clamping device 101 may be pivoted around the bearing pin 108 around the second rotary axis y, so that the aligning shell 204 may be for instance aligned to the blade 300 for providing a proper holding effect. Thus, the aligning shell 204 is parallel with the progression of the bottom flange of the blade 300, so that a proper clamping may be provided.

Figure 8:
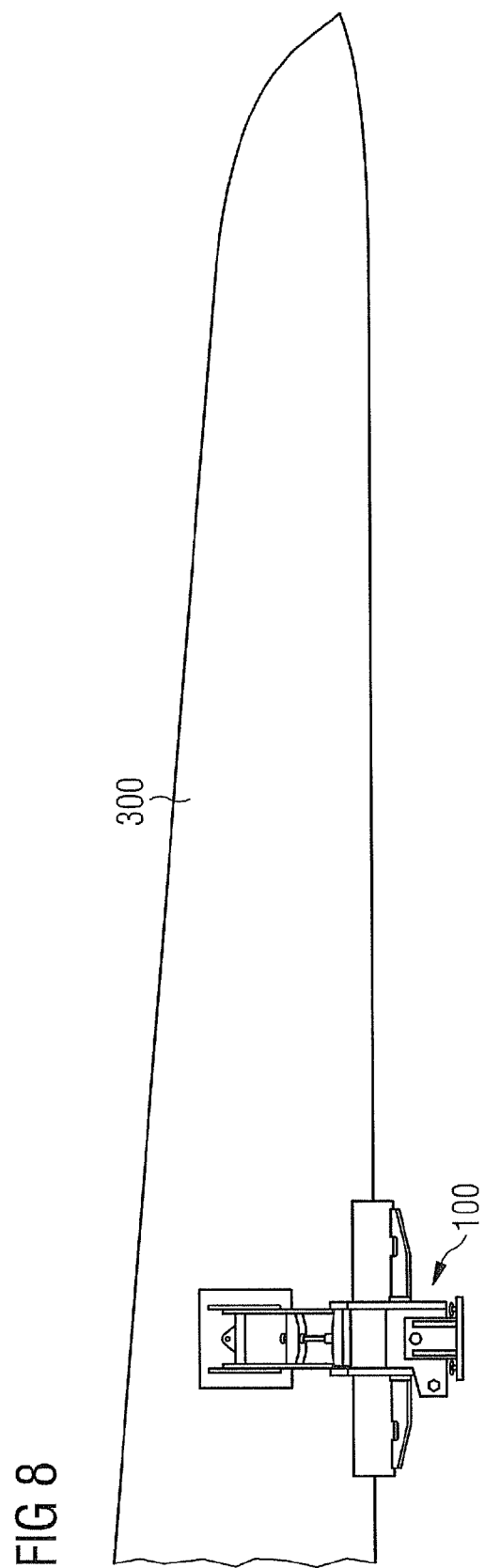
FIG. 8 illustrates an exemplary embodiment of a fixation of the mounting bracket device and a blade.

FIG. 8 illustrates an enlarged view of the mounting bracket device 100 for mounting a blade element 300.

Figure 9:
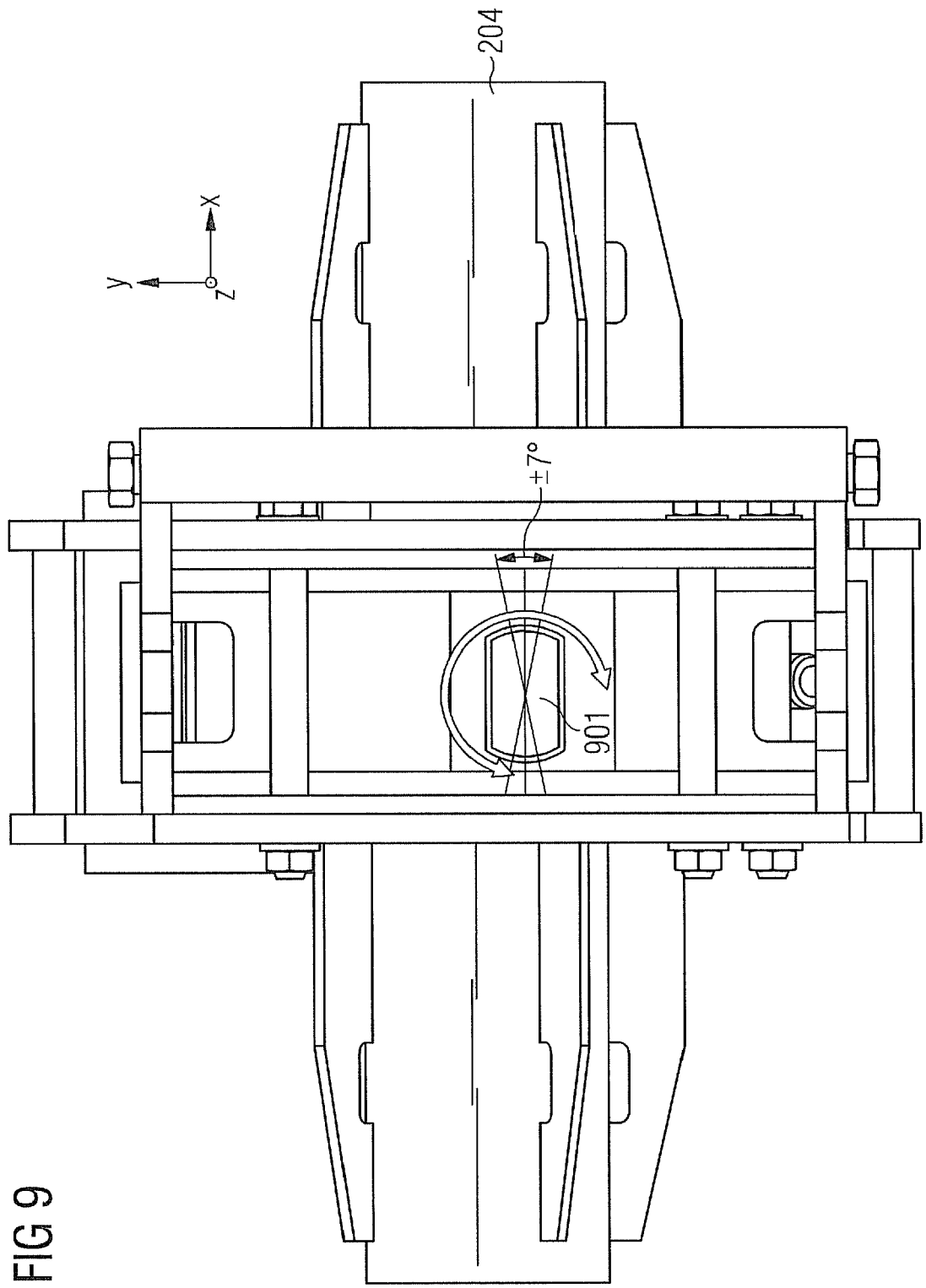
FIG. 9 illustrates an exemplary embodiment of a flexible adjustment system pivotable around a third rotary axis according to an exemplary embodiment.

FIG. 9 illustrates a further exemplary embodiment of the mounting bracket device 100 wherein a rotation around a third rotary axis z may be provided. The adjustment system 102 or the connecting system 103 may comprise a shaft element 901 that may be adapted for engaging a respective element of the transportation device 120. The shaft element 901 may be adapted for engaging e.g. a corner casting, such as a twist-lock. The shaft element 901 may provide a rotation around the z-axis in the range of e.g. 7° degrees but may also be possible around 10° degrees, 20° degrees or around 360° degrees.

Figure 10:
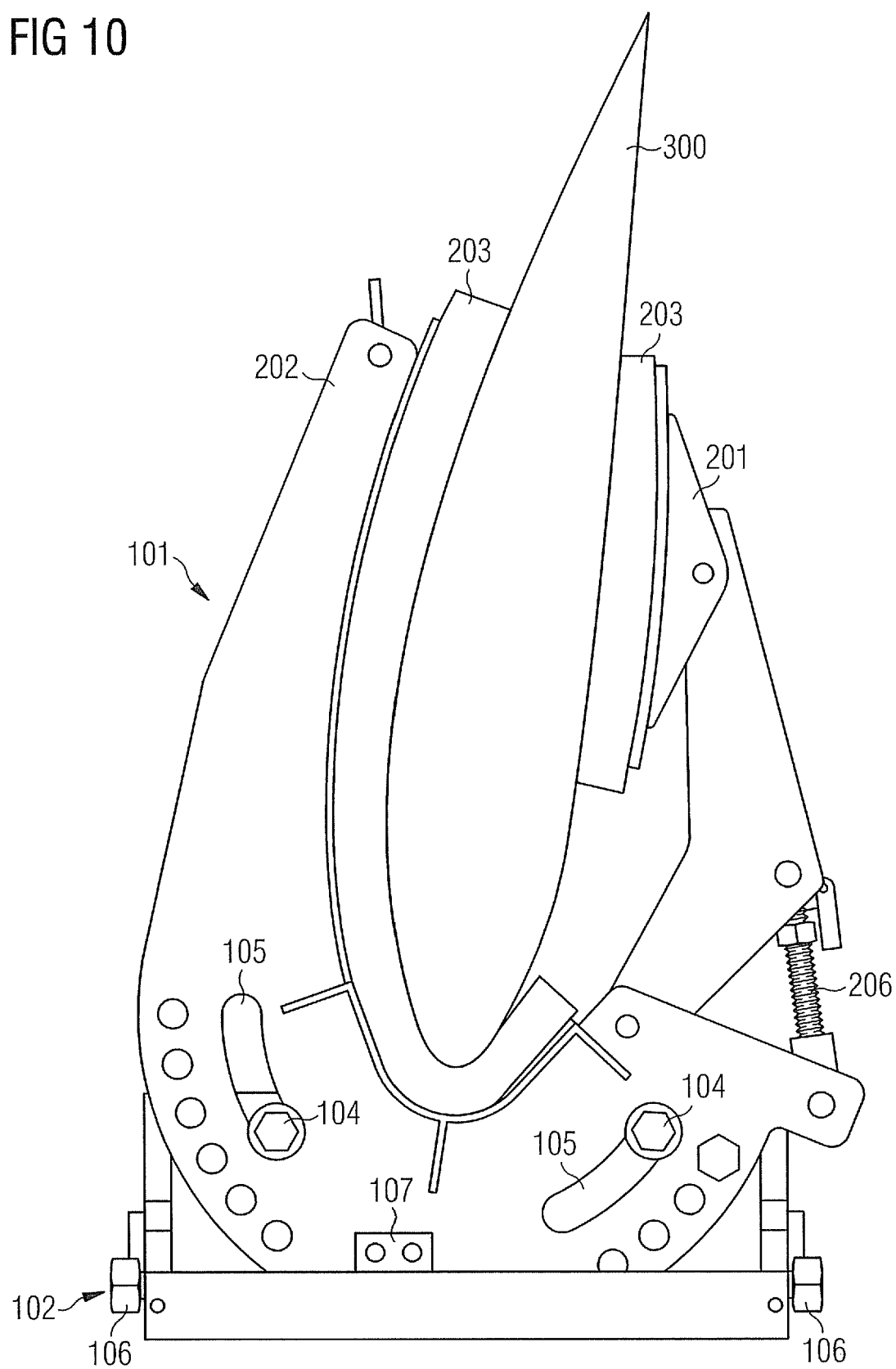
FIG. 10 shows a cushioning element around a blade according to an exemplary embodiment.

FIG. 10 illustrates the mounting bracket device 100 comprising the clamping device 101 and the adjustment system 102. The movable jaw 201 and the clamping 202 clamp the blade 300. Between the movable jaw 201 and the clamping jaw 202 the cushioning element 203 is located in order to provide a soft clamping of the blade element 300, so that damages due to transportation may be prevented. The cushioning element 203 may comprise material made of polyurethane, for instance. The cushioning element 203 may be aligned to the curvature or the surface of the blade element 300 to provide a proper cushioning effect.

Figure 11:
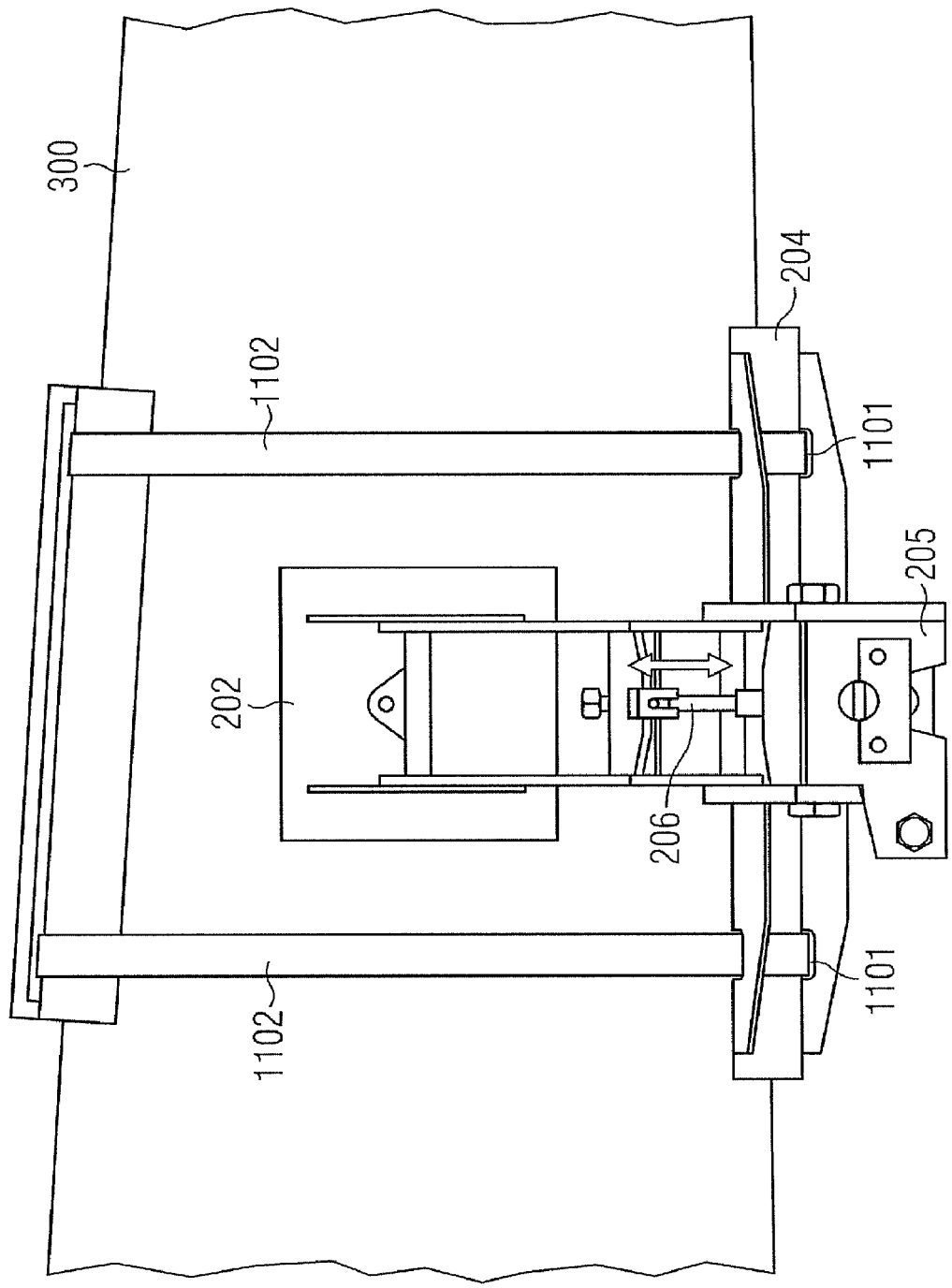
FIG. 11 shows an exemplary embodiment of a mounting bracket device including a transport opening according to an exemplary embodiment.

FIG. 11 illustrates the mounting bracket device 100 comprising a transport opening 1101 through which a strap lashing 1102 may be guided. The strap lashing 1102 may be wrapped around the blade 300 in order to improve the fixation of the blade 300 to the mounting bracket device 100. Thus, when fixing the blade 300 to the mounting bracket device 100, the holding force is not longer exerted punctually by the clamping device 101, and may additionally be exerted by the strap lashing 1102, so that a proper fixation of the blade 300 to the mounting bracket device 100 may be provided.

Furthermore, FIG. 11 illustrates the rigging screw 206 with which a distance between the movable jaw 201 and the clamping jaw 202 may be adjusted. Furthermore, the height of the movable jaw 201 or the clamping jaw 202 with respect to the size or the height and/or width of the blade 300 may be adjusted by a further mechanism. Thus, the fixation may be softer and the movable jaw 201 and the clamping jaw 202 may be adjustable to a variety of different size blades 300.

Figure 12:
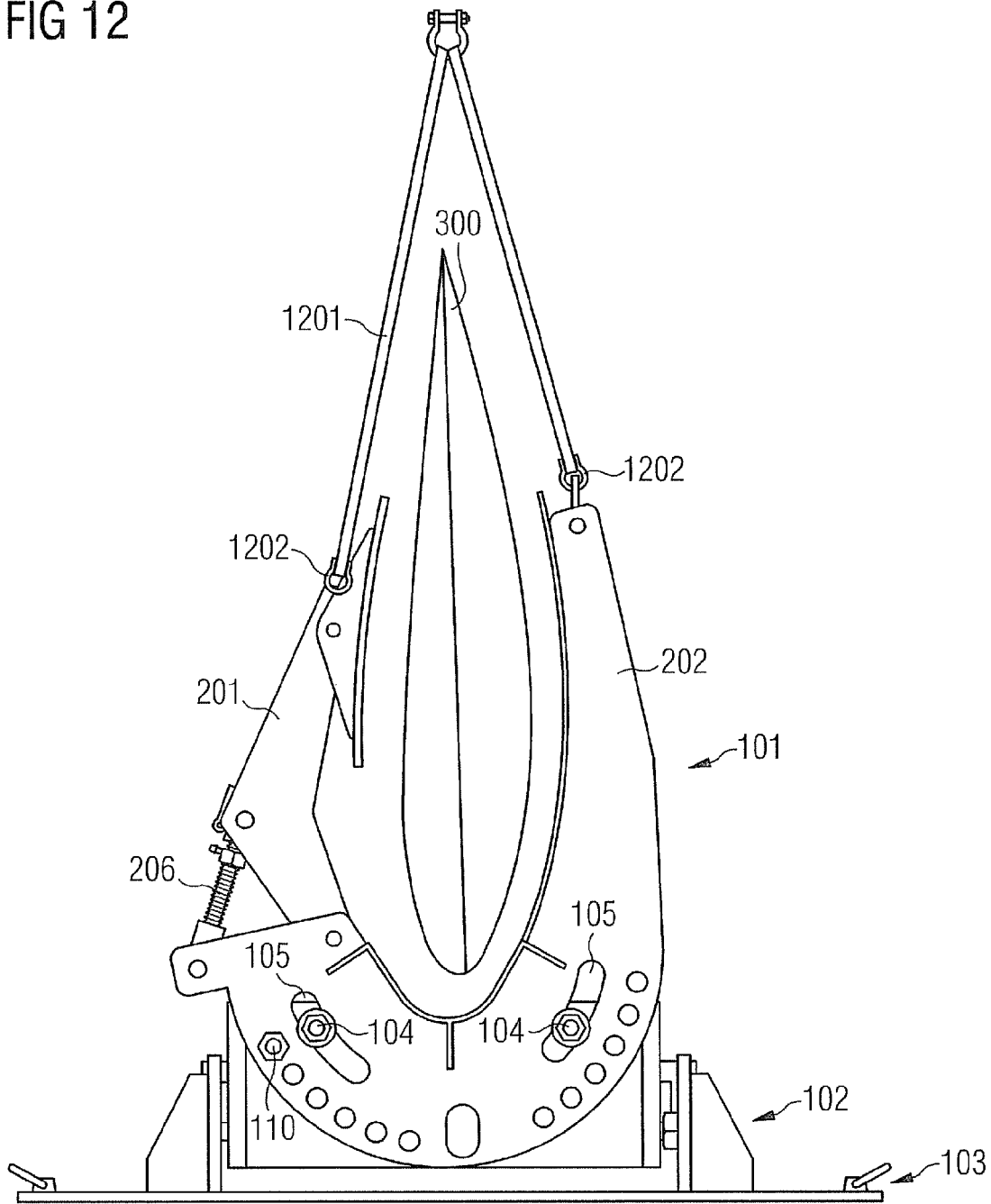
FIG. 12 shows an exemplary embodiment of the present invention comprising two lifting lugs.

FIG. 12 illustrates an exemplary embodiment of the mounting bracket device 100, wherein the clamping device 101 comprises a lifting lug 1202 through which a transportation belt 1201, such as a sling or a chain (lifting equipment) may be guided. Thus, the mounting bracket device 100 may be transported by e.g. a crane from one transportation device 120 to another transportation device 120 without the need of opening the clamping device 101 and without taking the blade 300 from one mounting bracket device 100 to another. Thus, the risk of damaging the blade 300 due to a change of the mounting bracket device 100 may be reduced because only once the mounting bracket device has to be attached to the blade 300 for the whole transportation path, i.e. for a plurality of different transportation devices 120. Thus, also a change of the transportation device 120, for instance a change from a ship to a truck, may be eased, because only the connecting system 103 has to be released and the whole mounting bracket device 100 may be changed to the other transportation device 120. Further steps of opening, amending and fixing the clamping device 101 that lead to the need of readjusting the blade element 300 to the clamping device 101 may be prevented. Thus, maintaining time and transportation time as well as repair time and handling time may be reduced when changing the transportation devices 120. With other words, the mounting bracket device 100 may be attached to the blade 300 in the beginning of the transportation proceeding and remains attached during the entire transport until arrival at the wind turbine.

As shown in FIG. 12, the connecting system 103 may comprise fixation elements especially designed for attaching the mounting bracket device 100 to common types of transportation devices 120. In particular, the fixing means of the connecting system 103 may comprise standardized interfaces means.

Thus, an easy and fast change between common transportation devices 120 may be provided.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 mounting bracket device
101 clamping device
102 adjustment system
103 connecting system
104 engagement element
105 long hole
106 threaded rod
107 guiding element
108 bearing pin
109 receiving groove
110 fixing screw
120 transportation device
201 movable jaw
202 clamping jaw
203 cushioning element
204 aligning shell
205 securing element
206 rigging screw
300 blade
401 engaging profile
402 protruding element
601 adaptor element
901 shaft element
1101 transport opening
1102 strap lashing
1201 transportation belt
1202 lifting lug
x first rotary axis
y second rotary axis
z third rotary axis
r radius

The invention claimed is:

1. A mounting bracket device for mounting a blade of a wind turbine to a transportation device, the mounting bracket device comprising:
   a clamping device for holding the blade;
   an adjustment system adapted to align the clamping device with respect to a first transportation device around a first rotary axis, around a second rotary axis, and around a third rotary axis, wherein the first rotary axis, the second rotary axis and the third rotary axis have different axial directions with respect to each other; and
   a connecting system for removably connecting to the first transportation device,
   wherein the connecting system removably connects the clamping device and the adjustment system to the first transportation device.

2. The mounting bracket device of claim 1,
   wherein the adjustment system comprises an engagement element extending along the first rotary axis,
   wherein the clamping device comprises an elongated hole,
   wherein the engagement element is engaged by the elongated hole, and
   wherein the elongated hole comprises a curved shape that defines a curved moving path of the clamping device, so that the clamping device follows the moving path defined by the curved shape of the elongated hole when the clamping device is rotated around the first rotary axis.

3. The mounting bracket device of claim 2,
   wherein the adjustment system comprises a threaded rod,
   wherein the clamping device comprises a guiding element,
   wherein the guiding element is connected to the threaded rod, so that the guiding element is movable along the threaded rod due to a rotation of the threaded rod, and
   wherein the guiding element is fixed to the clamping device, so that a movement of the guiding element along the threaded rod causes a rotation of the clamping device around the first rotary axis.

4. The mounting bracket device of claim 1,
   wherein the clamping device comprises an engaging profile,
   wherein the adjustment system comprises a protruding element, and
   wherein the protruding element is adapted for engaging into the engaging profile, so that depending on an engagement position of the protruding element into the engaging profile an alignment of the clamping device with respect to the transportation device around the first rotary axis is adjusted.

5. The mounting bracket device of claim 1,
   wherein the clamping device comprises a bearing pin extending along the second rotary axis,
   wherein the adjustment system comprises a receiving groove, and
   wherein the bearing pin is adapted for being engaged into the receiving groove, so that the clamping device is pivotable around the second rotary axis.

6. The mounting bracket device of claim 1,
   wherein the adjustment system comprises a shaft element, and
   wherein the shaft element is adapted to connect the mounting bracket device with the first transportation device in a pivotable manner around the third rotary axis.

7. The mounting bracket device of claim 1,
   wherein the connecting system comprises an adaptor element, and
   wherein the adaptor element is adapted for fixing the mounting bracket device to a second transportation device.

8. The mounting bracket device of claim 1,
   wherein the clamping device comprises a movable jaw and a clamping jaw, and
   wherein the movable jaw is movable towards the clamping jaw for clamping the blade between the movable jaw and the clamping jaw.

9. The mounting bracket device of claim 8,
   wherein the movable jaw and the clamping jaw are adjustable to a size of the blade.

10. The mounting bracket device of claim 9,
    wherein the clamping device comprises a rigging screw for driving the movable jaw.

11. The mounting bracket device of claim 8,
wherein the movable jaw and the clamping jaw comprise a cushioning element, and
wherein the cushioning element is adapted for cushioning the blade.

12. The mounting bracket device of claim 1,
wherein the clamping device comprises a transport opening, and
wherein the transport opening is adapted for receiving a strap lashing for fixing the blade.

13. A method of mounting a blade of a wind turbine to a transportation device, the method comprising:

fixing a clamping device and an adjustment system to the transportation device by a connecting system, the clamping device is adapted to hold the blade; and aligning the clamping device with respect to the transportation device around a first rotary axis, around a second rotary axis, and around a third rotary axis by the adjustment system, wherein the first rotary axis, the second rotary axis and the third rotary axis have different axial directions with respect to each other.

\* \* \* \* \*